(12) United States Patent
Groves, II

(10) Patent No.: US 7,921,867 B2
(45) Date of Patent: Apr. 12, 2011

(54) ELBOW PLUG EXTERNAL SLEEVE VALVE

(75) Inventor: Frank W. Groves, II, Sisters, OR (US)

(73) Assignee: Olmsted Products Co., Traverse City, MI (US)

( * ) Notice: Subject to any disclaimer, the term of this patent is extended or adjusted under 35 U.S.C. 154(b) by 0 days.

(21) Appl. No.: 11/899,235

(22) Filed: Sep. 5, 2007

(65) Prior Publication Data

US 2008/0054208 A1 Mar. 6, 2008

Related U.S. Application Data

(60) Provisional application No. 60/842,533, filed on Sep. 6, 2006.

(51) Int. Cl.
*G05D 11/00* (2006.01)
(52) U.S. Cl. .......... 137/87.04; 137/500; 251/25
(58) Field of Classification Search .......... 251/30.01, 251/343, 25, 344, 31; 137/501, 503, 505, 137/498, 500, 87.01, 87.03, 87.04
See application file for complete search history.

(56) References Cited

U.S. PATENT DOCUMENTS

| | | | | |
|---|---|---|---|---|
| 1,925,531 A | * | 9/1933 | Grunsky | 137/625.39 |
| 2,352,799 A | * | 7/1944 | Newton | 137/375 |
| 2,529,412 A | | 11/1950 | Parker | |
| 2,729,234 A | * | 1/1956 | Stevenson | 137/498 |
| 2,840,109 A | | 6/1958 | Wadleigh | |
| 2,929,406 A | | 3/1960 | Anderson | |
| 3,116,756 A | * | 1/1964 | Alderson | 137/875 |
| 3,324,879 A | * | 6/1967 | Bucknell et al. | 137/454.6 |
| 4,471,810 A | * | 9/1984 | Muchow et al. | 137/625.37 |
| 4,500,070 A | * | 2/1985 | Riollet et al. | 251/282 |
| 4,572,234 A | | 2/1986 | Schwelm | |
| 4,700,884 A | * | 10/1987 | Barrett et al. | 236/12.12 |
| 4,711,267 A | | 12/1987 | Schwelm | |
| 4,724,864 A | | 2/1988 | Schwelm | |
| 4,809,949 A | | 3/1989 | Rakieski | |
| 4,856,756 A | * | 8/1989 | Combs | 251/297 |
| 5,009,393 A | | 4/1991 | Massey | |
| 5,186,432 A | | 2/1993 | Van De Moortele | |
| 5,411,050 A | | 5/1995 | Saville | |
| 5,524,863 A | | 6/1996 | Davis | |
| 5,531,244 A | * | 7/1996 | Siver | 137/315.21 |
| 5,711,340 A | * | 1/1998 | Gusky et al. | 137/68.19 |
| 5,975,134 A | | 11/1999 | Schwëlm | |
| 6,024,128 A | | 2/2000 | Hartman et al. | |
| 6,148,856 A | | 11/2000 | Kropp | |
| 6,520,481 B2 | * | 2/2003 | Harneit | 251/207 |
| 6,802,458 B2 | | 10/2004 | Gregory | |
| 2007/0045584 A1 | | 3/2007 | Fortner et al. | |

* cited by examiner

*Primary Examiner* — Stephen M Hepperle
*Assistant Examiner* — Andrew J Rost
(74) *Attorney, Agent, or Firm* — Foley & Lardner LLP

(57) ABSTRACT

An elbow fluid flow valve exhibiting reduced flow loss and including a body having a specified shape and size and defining a short radius associated with an elbow shaped fluid passageway characterized by a first fluid flow inlet and a second fluid flow outlet. A cover secures over the valve body, and such that a generally sleeve shaped annulus is defined therebetween. A light-weight and linearly translatable sleeve is mounted exteriorly of the valve body and within the intermediately defined annulus. The sleeve is operable to be displaced between a first location permitting fluid flow to the outlet and a second location interrupting fluid flow. A control element is operably connected to a pair of access ports, in turn communicated with one or a pair of interior regions in communication with locations of the displaceable sleeve and, upon experiencing at least one of a pressure and flow disparity between valve inlet and outlet, facilitates displacement of the sleeve to the second (flow interrupting) location.

4 Claims, 9 Drawing Sheets

US 7,921,867 B2

ELBOW PLUG EXTERNAL SLEEVE VALVE

CROSS-REFERENCE TO RELATED APPLICATIONS

This Application is a nonprovisional application of and claims priority benefit (under 35 USC 119(e)) from U.S. provisional application 60/842,533 filed on Sep. 6, 2006, and entitled "The Elbow-Plug, External Sleeve Valve, an Efficient Two-Way Valve with Multiple Applications."

FIELD OF THE INVENTION

The present application discloses a two-way hydraulic valve incorporating a modulating element axially slidable over a cylindrical central body exhibiting a machined, cast or otherwise formed flow path approximating such as a ninety degree elbow. Specifically, the present design exhibits a smoother elbow configuration, by virtue of its central body exhibiting a cast or machined flow path, and which exhibits a greatly decreased pressure drop than as opposed to elbow valves of existing design.

BACKGROUND OF THE INVENTION

Description of the Prior Art

The prior art is well documented with examples of two-way valves, these including most notably poppet valves in which a moving interior element is either a poppet or a sleeve sliding within an associated sleeve or bore, this in order to provide flow modulation or a simple on/off function. A significant problem associated with the prior art designs is the instance of significant pressure drop (or head loss) associated with the fluid flow, in particular with valve designs exhibiting any significant angle of curvature or bend. This is most pronounced in instances where a standard ninety (90°) degree bend or elbow valve is specified.

Existing valve technology applied to attempts to reduce pressure drop/head loss for two way valves include such as ball valves, rotatable plug valves, and butterfly valves. While providing advantageous pressure drop profiles, such existing valve technologies suffer from the shortcoming of providing only a very narrow variety of control options, as well as slow response parameters.

An additional type of 2-way valve exhibits a specialty cast or otherwise manufactured flow vanes in order to guide fluid flow through the valve, including such as an internal sliding poppet. This category, which includes such as what are commercially known as Olmsted style valves (Olmsted Products Co.), exhibit only fairly small improvements in flow efficiency (such as on the order of a 10% reduction in pressure drop).

Other and additional types of valves are known with external sliding sleeves, such as commercially known as the Hurit Sliding Sleeve Valve, these further not constituting low pressure drop valves, nor incorporating any type of elbow-plug concept.

SUMMARY OF THE INVENTION

The present invention discloses an improved elbow fluid flow valve which exhibits reduced flow loss over such as a short radius and 90° (elbow) bend, this including a body having a specified shape and size and defining a fluid passageway characterized by a first fluid flow inlet and a second fluid flow outlet. A cover element secures over the valve body, and such that a generally sleeve shaped annulus is defined therebetween.

A linearly translatable sleeve is mounted exteriorly of the valve body and within the intermediately defined annulus. The sleeve is operable in response to either an internally mounted coil spring or other fluid pressuring means, and such that it can be displaced between a first location permitting fluid flow to the outlet and a second location interrupting fluid flow, and by which the sleeve abuts a likewise annular seating location defined in the valve body and which fully seals the associated fluid outlet from the fluid inlet.

A control element (e.g. not limited to such as a manual control valve, hydraulic pilot control valve, relief valve, electrohydraulic valve) is operably connected to a pair of access ports, in turn communicated with one or a pair of interior regions in communication with locations of the displaceable sleeve and, upon experiencing either an externally applied signal to shift or at least one of a pressure and flow disparity between valve inlet and outlet, facilitates displacement of the sleeve to the second (flow interrupting) location.

BRIEF DESCRIPTION OF THE DRAWINGS

Reference now will be made to the attached drawings, when read in combination with the following description, wherein like reference numerals refer to like parts throughout the several views, and in which.

DETAILED DESCRIPTION OF THE PREFERRED EMBODIMENTS

Figure 1:
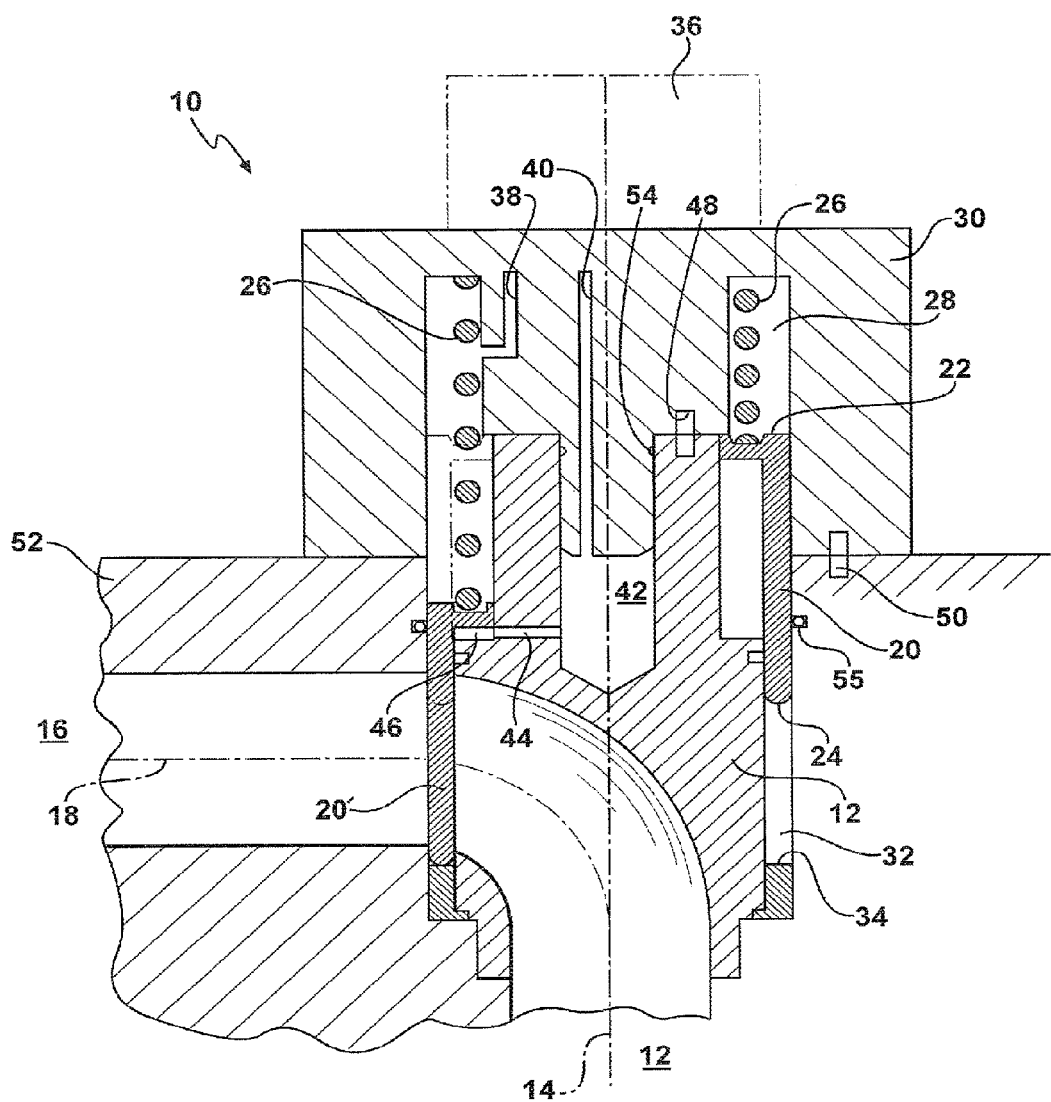
FIG. 1 is a cutaway illustration of a first embodiment according to the present inventions and in the form of a cartridge type valve, this designed for insertion into a standard DIN pocket of an associated manifold.

Referring now to FIG. 1, a cutaway illustration is shown at 10 of a cartridge type valve, and such as is designed for insertion into a standard DIN pocket of an associated manifold. As previously described, present disclosure discloses a two-way hydraulic valve incorporating a modulating element axially slidable over a cylindrical central body exhibiting a machined flow path approximating such as a ninety degree elbow. Specifically, the present design exhibits a smoother elbow configuration, by virtue of its central body exhibiting a cast or machined flow path, and which exhibits a greatly decreased pressure drop than as opposed to elbow valves of existing design.

Referencing again FIG. 1, a central cylindrical body is illustrated at 12, this typically constructed of a suitable metal material such as a steel, although additional material considerations, such as a very sturdy/heavy duty plasticized material may also be utilized and which exhibits the necessary properties of durability and resilience. A substantially angled (e.g. 90°) elbow shaped interior passageway is defined in the cutaway illustration of the body 12, this including an inlet 14 corresponding to a first extending centerline 14, and an outlet 16 corresponding to a second perpendicular extending centerline 18, and which further defines a main fluid flow path. While not clearly evident from the cutaway illustration of FIG. 1, the elbow defines in cross section a circular or other suitable polygonal shape which is formed into the cylindrical body 12 by either a machining, casting or other process known to one of ordinary skill in the art.

An interior and displaceable annular sleeve is provided and is illustrated in a modified cutaway fashion in both a first fully opened position, at 20, as well as a second fully closed position 20'. The sleeve may be constructed of a high strength material, in order to minimize associated wall thickness, and operates as a pressure vessel when the valve 10 is closed. The sleeve as shown further exhibits a generally annular shaped body, including both a spring seating upper end 22 and an arcuate configured bottom 24.

A coil spring (which along with the sleeve 20 defines the only moving elements of the assembly such as between compressed spring position 26 and expanded spring position 26') is seated within an associated upper annular cavity 28 defined in a cover plate 30 in turn secured to the cylindrical body 12. A lower sleeve shaped annulus 32 communicates with the coil spring 26 seated in the upper cavity 28 and such that a bottom defined end 34 of the annulus 32 further consists of a seat with cushioning and/or seal and defines a sealing location between the inlet 14 and outlet 18 locations of the elbow shaped interior passageway.

An upper disposed control valve 36, defining a first of several to be discussed versions of a control element, is seated atop or imbedded in the cover plate 30 which may be machined in order to match the porting patterns of any desired control valve which can also consist of any of an air, hydraulic or electric input source. A first control port 38 communicates the control valve 36 to a first region defined in the spring located upper cavity 28, whereas a second control port 40 communicates the control valve 36 to a second region (see further at 42) defined in a generally central location of the cylindrical body 12 which is co-linear with the inlet flow axis 14. The second region 42 further communicates, at 44, with an optional hydraulic cushion 46. It is further understood that the inlet and outlet flow axes associated with this valve design may be reversed, and without affecting the other features associated with the valve.

Additional features include orientation dowels, such as at 48 for mounting the cover plate 30 to an upper end of the central cylindrical body 12, as well as at 50 for securing a further bottom end location of the cover plate to a manifold/valve body 52, within which is seated the central body 12. Other features include a static seal, see at 54, for sealing between an inner and outwardly facing annular surface of the cover plate 30 and an opposing and inner abutting/annular surface associated with an upper end of the central body 12, and between which is defined the second interior region 42.

In operation, the central body 12 with interior defined elbow passageway is located with the alignment dowl 48 in order to prevent rotation of the cover plate 30. The cover plate 30 is in turn fixed in location to prevent rotation of the plate relative to the manifold 52. The sleeve is further illustrated in its fully open position, again at 20, as evident from the right side of the valve's axial centerline 14, as well as fully closed, again at 20', as shown on the left side of the centerline 14. Actuation of the valve between its open 20 and closed 20' positions is accomplished via selective pressure applied through the control ports 38 and 40.

As again shown in FIG. 1, the sleeve 20 can be guided by closely controlled tolerances established between the sleeve and the large diameter of the central body (see again upper annular cavity 28), and the smaller diameter associated with the upper portion of the body. When fully open, the fluid flow path through the valve is identical to or closely approximates that of a short radius elbow, and which further exhibits a small fraction of pressure drop through a cartridge style poppet valve exhibiting an equally sized main flow path.

In applications where little or no leakage is desirable in the closed position, the manifold 52 and central body 12 can be equipped with dynamic seals (see at 55) and the seat 34 at the bottom end of the valve 10 can also incorporate a like seal. Given the relatively small mass associated with the movable sleeve (between positions 20 and 20'), the valve 10 can exhibit a high degree of responsiveness, and when employed with the proper controls and given reasonably generous flow paths 38 and 40.

Figure 2:
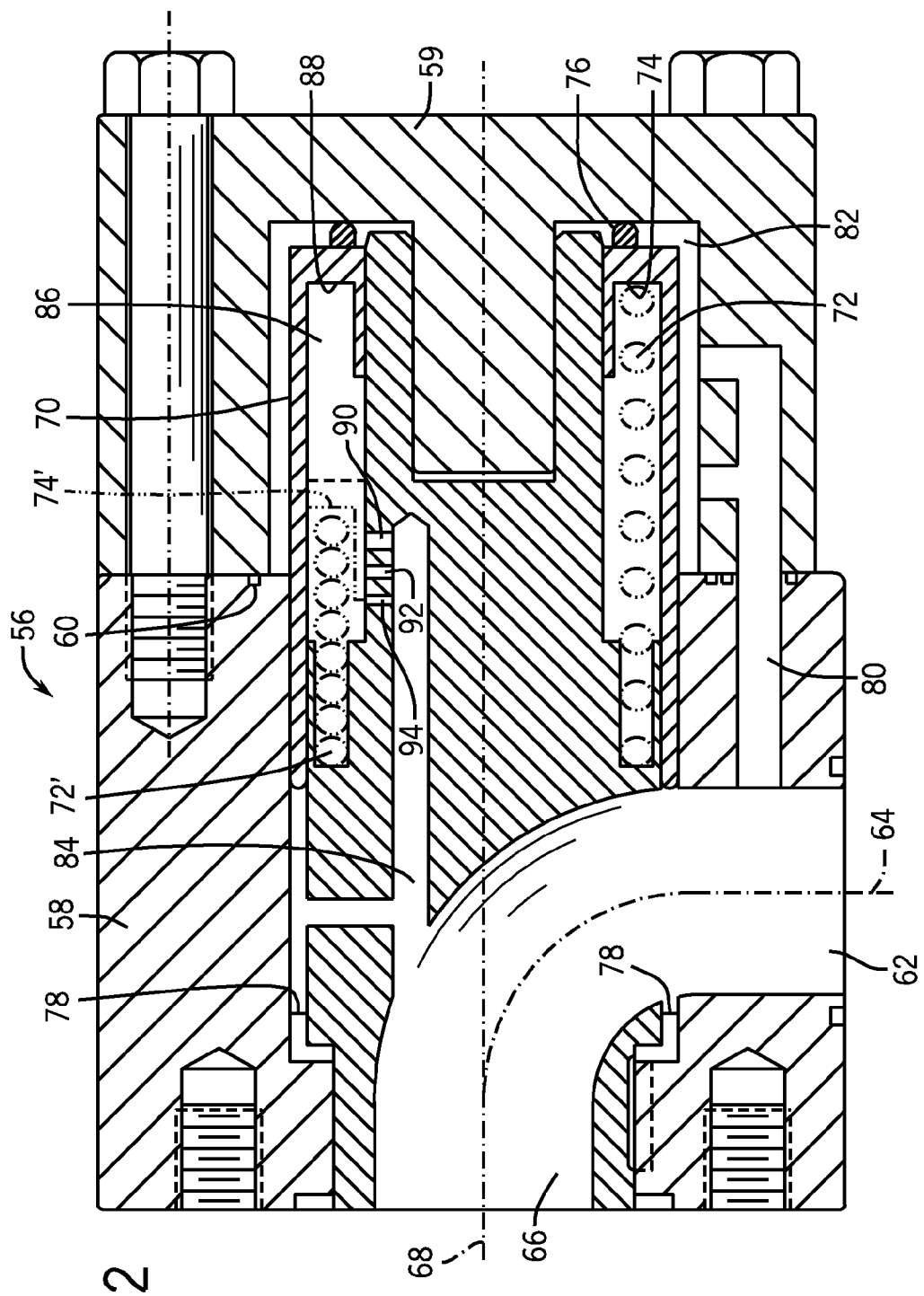
FIG. 2 is an illustration of a flow shut-off valve configuration according to a second preferred embodiment and in which the valve is designed to close upon flow from an accumulator to outlet exceeding a predetermined amount.

Referring now to FIG. 2, an illustration of a flow shut-off valve configuration is generally shown at 56 according to a second preferred embodiment, and in which the valve is designed to close upon flow from an accumulator to an outlet exceed exceeding a predetermined amount. Specifically, a main valve body is illustrated at 58 in the cutaway view of FIG. 2. A top cap 59 is also shown and which is secured to an end of the main body 58, such as through each of a plurality of dowels, such as is representatively shown at 60.

The elbow sleeve is illustrated with inlet 62 (along first centerline 64) and outlet (to cylinder) at 66, and along second perpendicular centerline 68. A modification of the sleeve is shown at 70 and which is biased in a normally open direction by a coil spring 72 seating against an interior configuration 74 associated with an end of the sleeve 70, and which biases against a seat/seal or other like cushioning support 74 in turn defining an inner end wall stop of an annulus 76, within which is seated the sleeve 70. The spring is further illustrated in a compressed condition, at 72', this corresponding to the sleeve 70 being displaced in a translating direction (not shown) corresponding to seating over and closing the elbow outlet 66 from its associated inlet 62 (see opposite end displaced locations 78).

A flow path 80 communicates with the accumulator inlet 62 (this defining an upstream pressure source) into a first region 82 which affects an end surface of the sleeve 70 in baising contact with end wall stop 76 of the associated annulus (thus influencing the sleeve 70 in a spring opening and closing direction relative the flow path elbow). A further flow path 84 is at a downstream location of the elbow (i.e. to the outlet 66) and further communicates with a further interior region 86 accessible to an inner defined end surface 88 of the sleeve 70, this in turn influencing, via progressively narrow diameter orifices 90, 92 and 94 communicating the second flow path 84 with the further interior region 86, cushioning of sleeve deceleration when actuated to the closed position.

Of note, the flow shut-off configuration illustrated in FIG. 2, constitutes a safety valve designed to rapidly close, in the event that flow from the accumulator (e.g. inlet 62) to the outlet 66 exceeds a predetermined amount. In normal operation, the sleeve 70 is held open by the spring (at expanded position 72). Accordingly, and in the absence of flow, the pressure is the same everywhere within the valve.

During normal operation, flow from the accumulator 62 (via flow path 80) exists at a higher pressure than the outlet pressure (via flow path 84), this as a result of the pressure drop of flow (or head loss) as it travels around the elbow. As flow increases, the pressure drop likewise increases, until the point is reached in which the difference in the pressures in regions 82 and 86 is such that the pressure in region 82 is sufficiently great to act upon the sleeve 70 to overcome the spring force (or other counter-biasing force), thus causing the sleeve to translate to the closed position, thus creating an even greater pressure drop, in turn resulting in very rapid closure of the valve 56. It is further noted that the cushioning orifices 90, 92 and 94 come into play at this point to provide a cushioning effect to the sleeve 70 as it deflects to an inner deflected end position (see further at 74') and corresponding to the spring being deflected to its fully closed position 72' and the annular extending end of the sleeve 70 abutting the inner sealing end stops 78.

By virtue of the importance of the rapid response required of this type of valve application, the mass of the sleeve 70 is kept intentionally as small as possible and while again employing high strength materials. The flow passages (e.g. again at 80 and 84) are reciprocally designed to be as large as practical, and so that restriction in these passages does not limit the responsiveness of the valve assembly 56.

Given again that the sleeve closes with sufficiently great speed, the hydraulic cushion is provided via the orifices 90-94, and in order to provide the necessary cushioning effect. As illustrated, the desired cushioning effect is achieved by successively cutting off a series of flow passages in the region 86. Alternatively, the hydraulic cushion can be relocated to the bottom end of the sleeve stroke (see approximate end stops 78).

Figure 3:
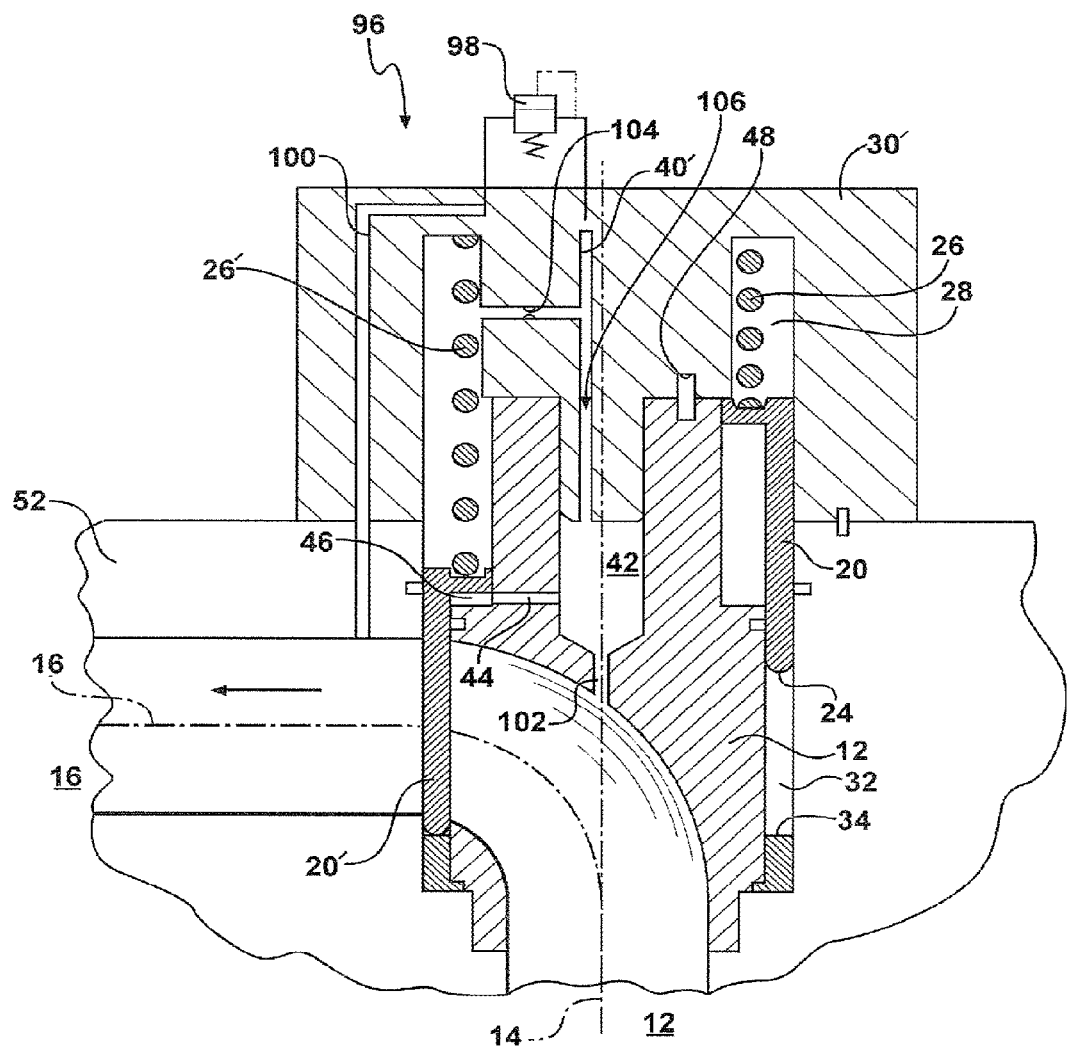
FIG. 3 is an illustration of an elbow plug variant according to the present inventions, incorporating a relief valve function in a DIN cartridge arrangement, with pilot relief valve of either direct or remote operating design, control orifices, and optional seals.

Referencing now FIG. 3, an illustration is generally shown at 96 of an elbow plug variant according to the present inventions, incorporating a relief valve function in a DIN cartridge arrangement, with pilot relief valve of either direct or remote operating design, control orifices, and optional seals. Repeating the description previously given in reference to FIG. 1, identical features are repetitively numbered and the description of this figure will be limited to the revised features forming a part of the alternate embodiment 96.

The control valve, generally referenced at 36 in FIG. 1, is substituted by a relief valve 98 in the current variant, this communicating to a modified control port 100 (in comparison to that shown at 38 in FIG. 1). A further passageway 102 exists between the input pressure/flow source 14 and the region 42 (this being closed in FIG. 1). The cover plate of FIG. 1 is reconfigured as a top cap 30' in FIG. 3 and further includes control orifices 104 and 106, these respectively intercommunicating the relief valve 98 with both the annulus 28 and the interior defined region 42, respectively, via a modification of the flow control port, at 40'.

Repeating the explanation of the valve operation associated with FIG. 1, a greatly increased inlet pressure will cause the fluid flow to travel through the passageway 102, into region 42, through modified port 40', via again the opening control orifices 104 and 106, and to thereby provide downward/closing translating pressure on the sleeve 20, concurrent with the biasing effect of the spring 26 and via the seating annulus 28. As previously described, the elbow plug design allows for significantly greater fluid flow to pass through a given cartridge size.

Figure 4:
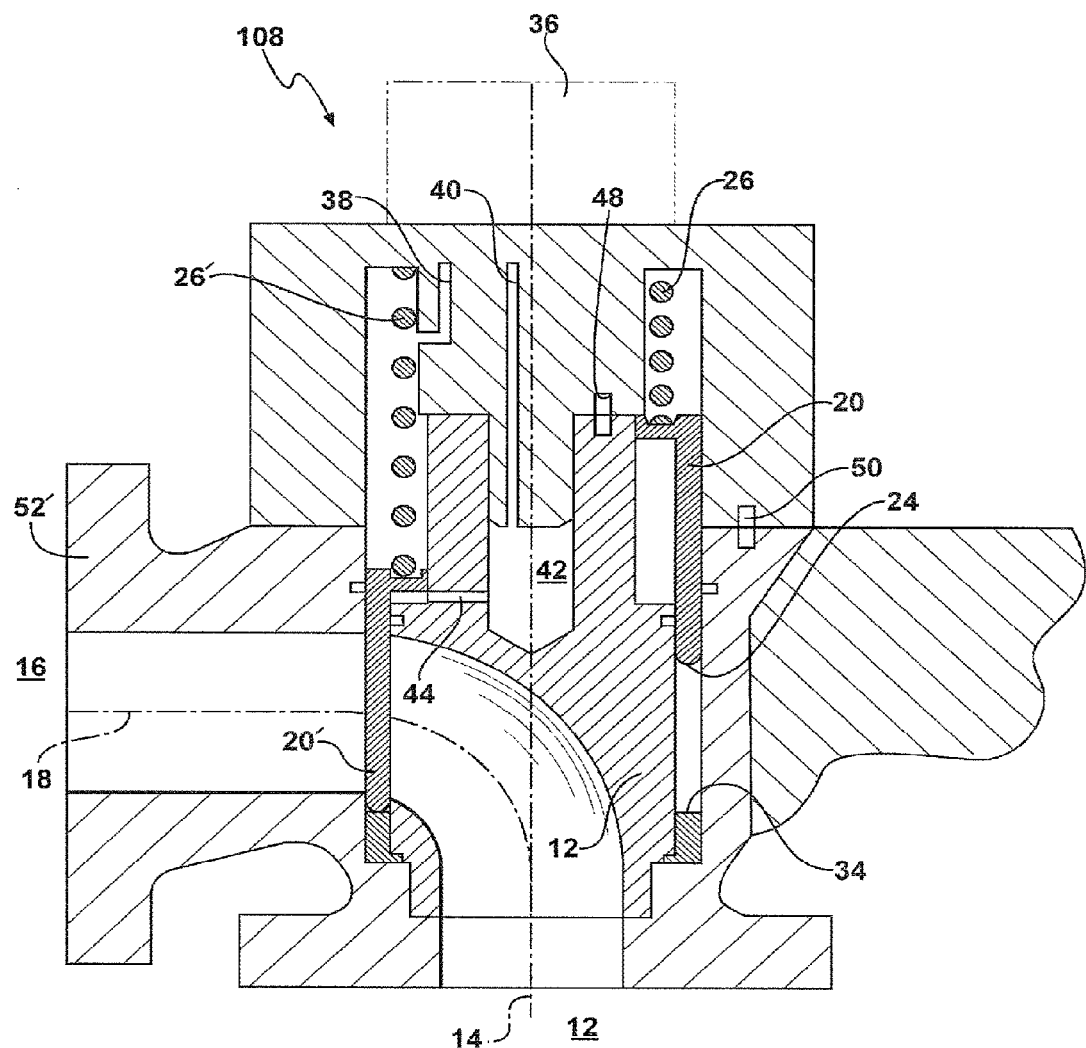
FIG. 4 is an illustration similar to that shown in FIG. 1, and further depicting the valve mounted in a cast body, suitable for right angle (90°) in-piping mounting.

FIG. 4 is an illustration, generally at 108, similar to that shown in FIG. 1, and further depicting the valve mounted in a cast body, suitable for right angle (90°) in-piping mounting. Specifically, the manifold construction is redesigned, as shown at 52' and as opposed to at 52 in FIG. 1. It is further understood that any of the valve configurations illustrated or discussed herein can be modified/designed to operate in this variant. Again, one advantage of the present inventions is the reduction of pressure drop as compared to prior art valve assemblies previously discussed.

Figure 5:
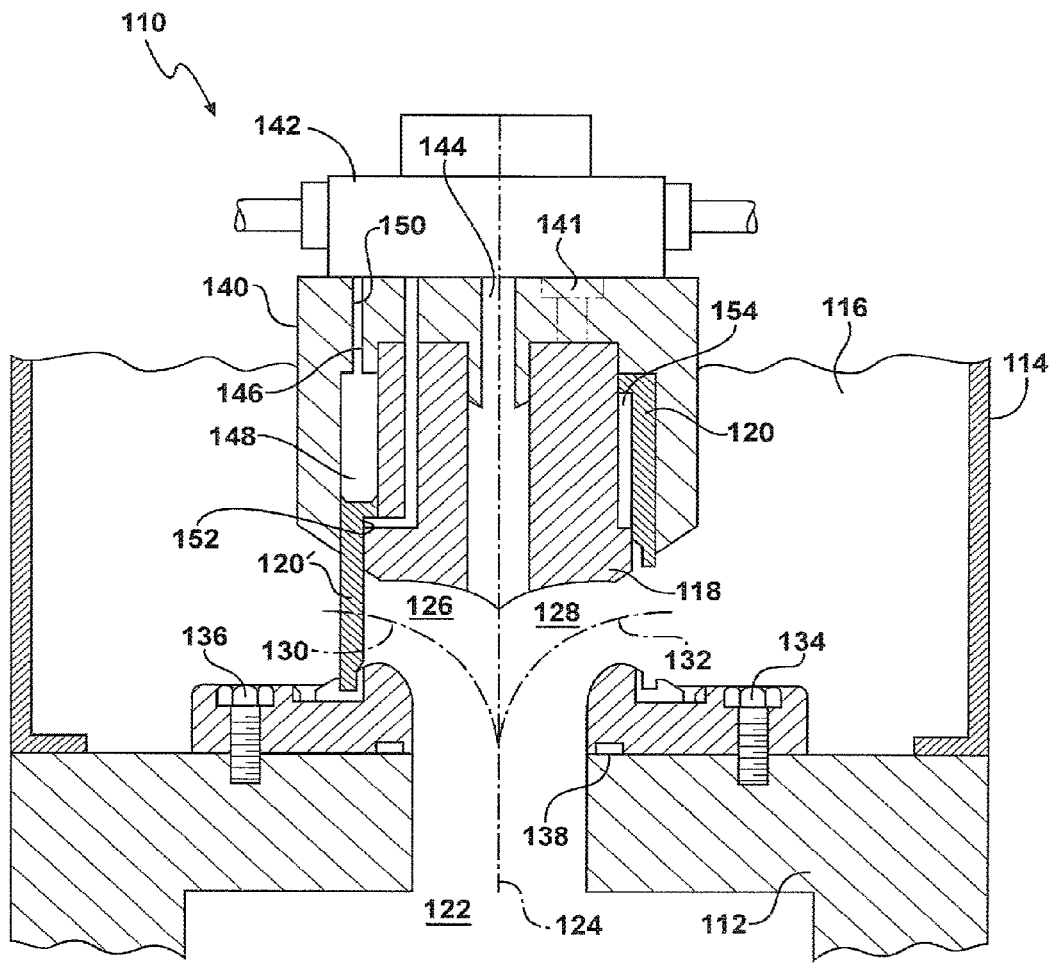
FIG. 5 is an illustration of an in-tank prefill valve according to a still further embodiment of the present invention and illustrating the valve mounted to a back end of a press cylinder exhibiting a rear mounted hydraulic reservoir within which the prefill valve is submerged.

Referring now to FIG. 5, an illustration 110 is provided of an in-tank prefill valve according to a still further embodiment of the present invention and illustrating the valve mounted to a back end of a press cylinder exhibiting a rear mounted hydraulic reservoir within which the prefill valve is submerged. The press cylinder is illustrated at 112, from which the upwardly extending side walls 114 define therein a fluid filled reservoir 116.

A central body 118 is illustrated and is positionally mounted within the reservoir 116 and such that a downwardly displaceable sleeve (see open position 120 and closed position 120') selectively opens and closes a fluid inlet 122 (see vertical centerline 124), with opposite fluid outlets 126 and 128 (see further curved centerlines 130 and 132, respectively). Mounting bolts, see at 134 and 136, are secured to the back of the cylinder 112. An elbow plug 138 with multiple passages is also provided for mounting the bolt flange and hardened seat.

A bolted-on top cap 140 (see also bolt 141 shown in phantom) is secured over the central valve (dual elbow defining) body 118, over which is secured a control valve 142 with both supply and return fluid ports. An optional porting for three-way prefill is further referenced at 144 and which generally corresponds to a centerline of the valve assembly illustrated in cutaway.

Fluid flow ports include such as that illustrated at 146 (leading to a sleeve closing inducing region 148), this in turn defining an annulus above the sleeve 120. An additional flow port 150 leads to a further contact location 152, this corresponding to an inner/underside projecting upper annular surface associated with the sleeve (this is also referenced by region 154, and which corresponds to the sleeve in an upwardly displaced and open position 120).

As illustrated, the flow path achieved by the design of FIG. 5 provides advantages over prior art valves, such as the assisting and guiding of the flow path through the multiple elbow arrangements (multiple outlets 126 and 128) designed into the embodiment. Another advantage is the reduced cost of manufacturing, resulting from the incorporation of the external sleeve 120, this reducing the weight associated with the casted body.

In one preferred operation, the pre-fill valve 118 is mounted in the associated piping (not shown) running to the cylinder 112, and rather than submerged within the reservoir 116. An additional option contemplates construction of a valve incorporating a body such as shown in the variant 108 of FIG. 4, however with the features shown in FIG. 5, thereby netting a much simpler in-piping pre-fill valve that results in both flow efficiency and cost savings, this further eliminating the necessity of an expensive shroud.

Figure 6:
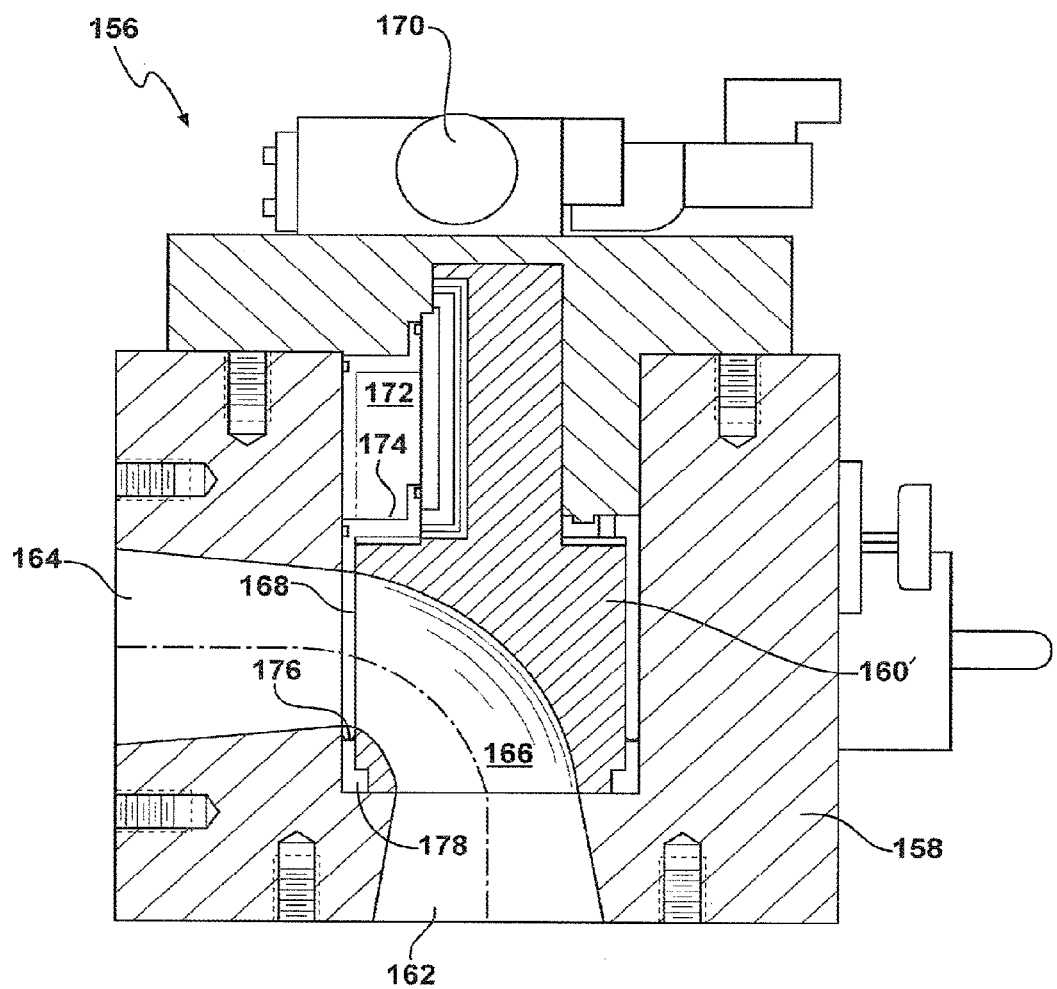
FIG. 6 is an illustration, again in cutaway, of an isolation type valve, and such as which are typically employed to isolate a drilling heave compensation cylinder from its associated accumulator, and which operates to rapidly close upon a sudden loss of pressure.

Referencing now FIG. 6, an illustration is shown at 156, again in cutaway, of an isolation type valve, and such as which are typically employed to isolate a drilling heave compensation cylinder from its associated accumulator, this operating to rapidly close upon a sudden loss of pressure. Features again include a fixed outer body 158, a valve body 160 defined within said outer body 158 and collectively defining an elbow with an inlet 162 and substantially ninety degree angled outlet 164. As shown, the inlet and outlet exhibit enlarged diameter locations, these narrowing in the turning region 166 corresponding to the inner valve body 160 and the displaceable sleeve, further shown at 168.

A control intake or manifold is shown at 170 and appropriate venting which communicates to an interior region 172. Upon a sudden loss of pressure along the inlet side 162, pressure from the control intake 170 exerts upon an annular defined top end location, at 174, associated with the sleeve 168, thereby causing the sleeve 168 to displace downwardly to an elbow closed position (see annular bottom end 176 of sleeve 168 biasingly seating against bottom defined annular seat 178.

In use, the isolation valve 156 operates to protect against both drill string and hose or piping failure, and by rapidly closing upon experiencing a sudden loss of pressure. The valve is further closed manually each and every time the associated drill bit (not shown) is lifted from its contact location with the hole. These valves have further been historically produced in castings, and with a more recent trend of machining them out of steel manifolds.

As illustrated, both the casted and machined valves incorporate internal poppets sliding within a bore (see again displaceable sleeve 168). It has been found that the cast valves are somewhat more efficient as a result of the flow directing vanes created, however either design constitutes a significant improvement over prior art valves given the external and slidable sleeve (again at 168 in this embodiment). Additionally, and while the valve 156 of FIG. 6 is illustrated without two side ports, it is understood that dual side ports can be designed into its architecture, and as is again clearly referenced in the related embodiment of FIG. 5.

Figure 7A:
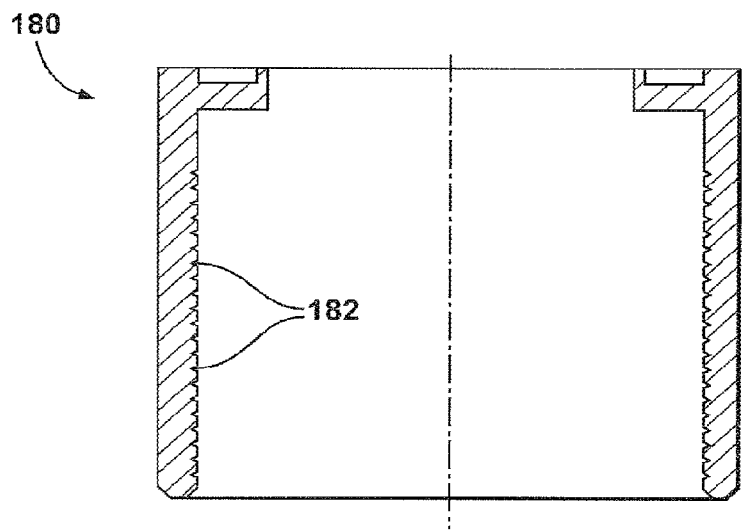
FIG. 7A is a cutaway illustration of a plurality of internal grooves formed in a portion of the valve sleeve according to any of several embodiments of the present inventions, and in order to pressure balance the sleeve to minimize side load during operation.

Referring to FIG. 7A, a cutaway illustration is shown at 108 of a plurality of internal grooves 182 formed in an internally disposed surface of a further configured valve sleeve, this according to any of several embodiments of the present inventions described herein. As previously described, the internal groove design operates in order to pressure balance the sleeve 180, and such as to minimize side load during operation.

Figure 7B:
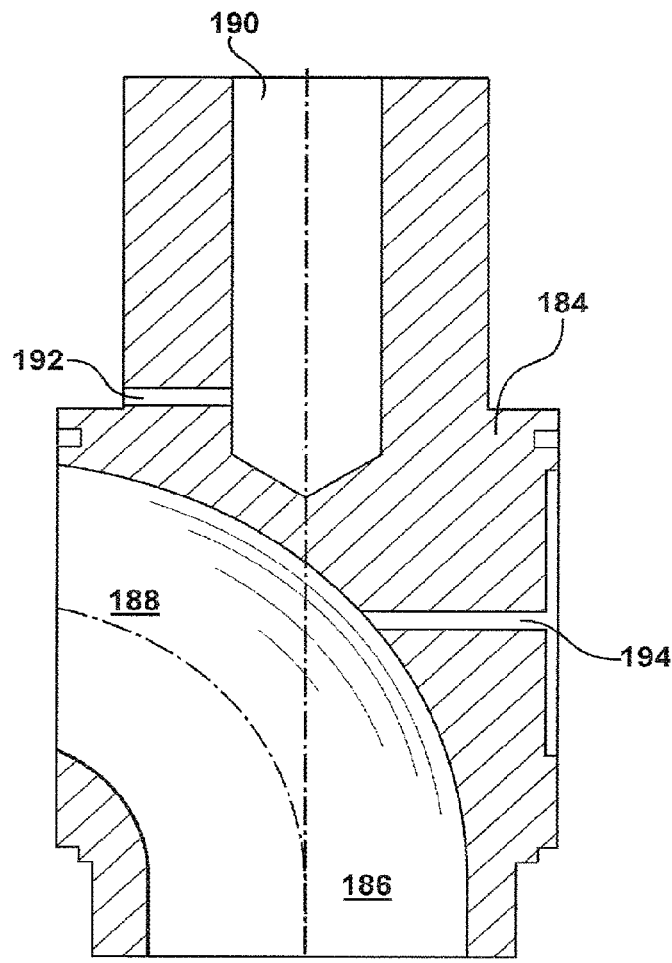
FIG. 7B is a further illustration of a dummy passage machined or cast into the elbow valve and in a pressure balancing direction opposite that of the angled outlet.

Referring further to FIG. 7B, a valve body 184 is shown and includes such features as an elbow defined section with inlet 186 and outlet 188, an upper region 190 fluidly communicated with a control valve (not shown) and further including a side disposed hydraulic cushion 192. As with FIG. 7A, the control valve 184 is illustrated in section (without reference to the several remaining components of a completed valve assembly, reference further being had to the previous embodiments described herein). A dummy passage is illustrated at 194, this being machined or cast into a side disposed location associated with the elbow valve 184, and which operates in a pressure balancing direction, opposite that of the angled outlet 188. As is understood by one of ordinary skill in the art, no flow is delivered to the valve side associated with the dummy passageway, as there is no port at that location, it further being understood that an associated sleeve (not shown) would in operation be exposed to a balanced pressure exerted from both sides thereof.

Figure 8:
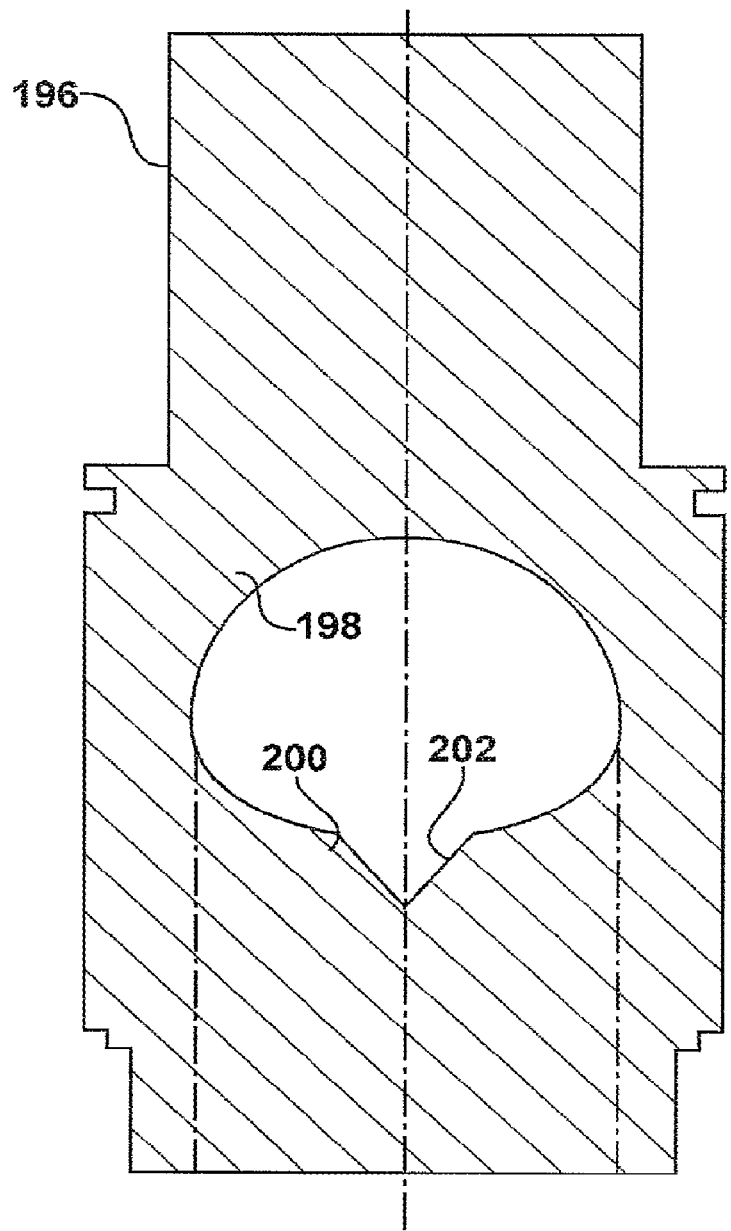
FIG. 8 is a side cutaway illustration of a profile associated with a valve profile side port, and by which a standard circular/oval shaped opening has been modified to a generally oval shape with an incorporated "V" shaped bottom portion and which, upon initial opening the internal flow permitting sleeve member, only a small amount of flow (through the bottom "V" profile) passes, thereby providing good low speed control to the assembly.

FIG. 8 illustrates at 196 a side cutaway profile in section of a valve elbow (or port), and by which a standard circular/oval shaped opening has been modified to a generally oval shape (see interior curved surface 198) with an incorporated "V" shaped bottom portion, see angled bottom surfaces 200 and 202). In operation, and upon initial opening the internal flow permitting sleeve member (again not referenced in the sectional view of FIG. 8), only a small amount of flow (through the bottom "V" profile) passes. As a result, the valve body configuration 192 operates to provide improved low speed/flow control to the assembly, while the oval shaping of the elbow passageway accommodates increased flow volume.

Figure 9:
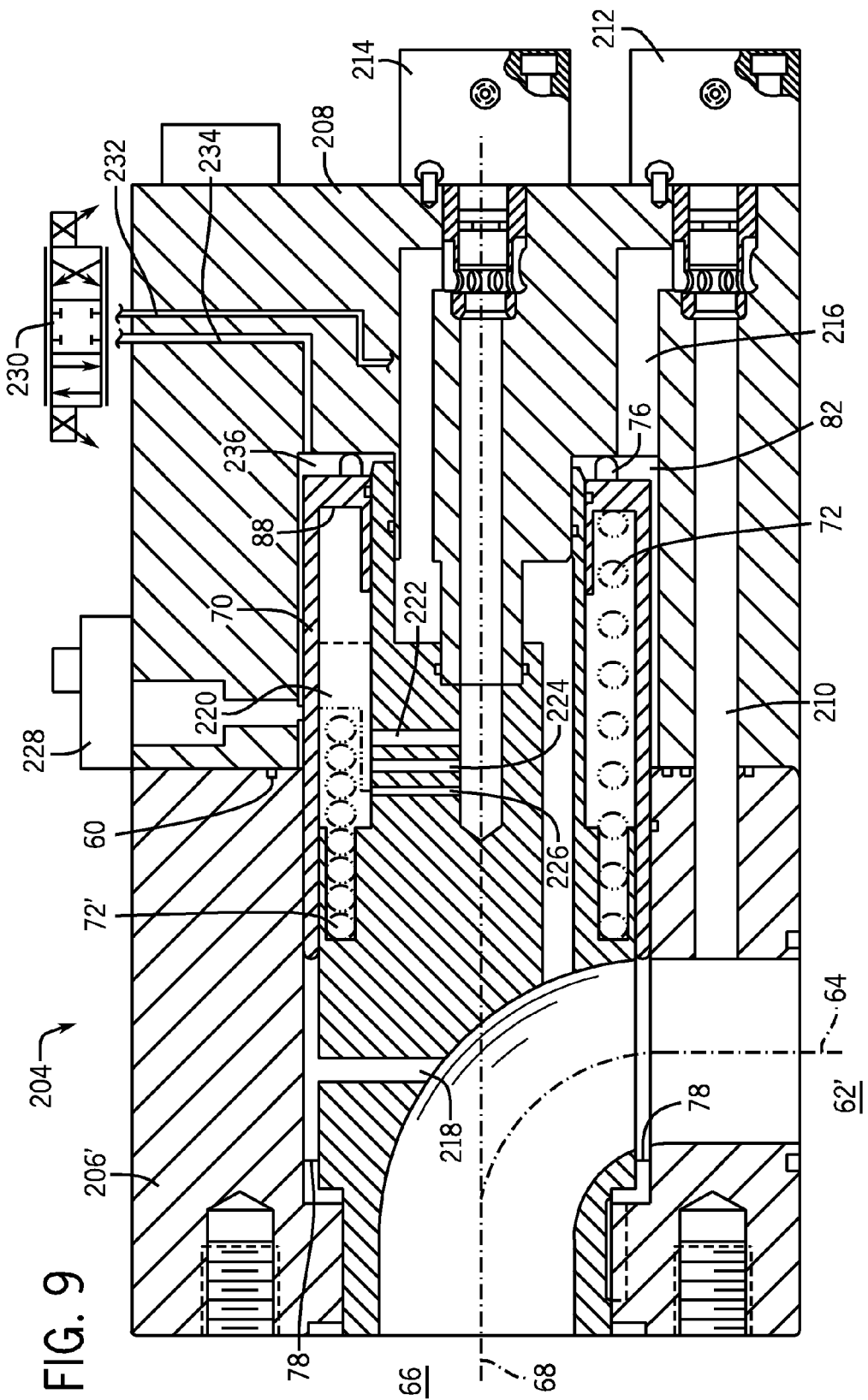
FIG. 9 is an illustration of an anti-recoil valve assembly according to a still further preferred embodiment and, additionally to the characteristics associated with the valve assembly of FIG. 2 provides the further feature of disabling the flow shut-off features and turning control of the sleeve position over to a position control feedback system, thereby controlling recoil of the drilling riser during such as emergency disconnect of the riser from such as a subsea BOP stack.

Finally, and referring to FIG. 9, an illustration is provided at 204 of an anti-recoil valve assembly, this according to a still further preferred embodiment and, additional to the characteristics associated with the valve assembly previously described in FIG. 2, provides the further feature of disabling the flow shut-off features and turning control of the sleeve position over to a position control feedback system, thereby controlling recoil of the drilling riser during such as emergency disconnect of the riser from such as a sub-sea BOP stack.

As with the flow valve shut off configuration previously illustrated at 56 in FIG. 2, the anti-recoil valve 204 is mounted between an accumulator (not shown by communicated to valve via inlet location previously shown at 62 in FIG. 2) and a drilling riser tensioner (also not shown but communicated through corresponding outlet 66). As previously done, identical reference numbers are used for features also shown in the prior embodiment of FIG. 2, and new reference callouts will be reserved for new features associated with the embodiment 204.

Contrasting to the elements recited in FIG. 2, a variation of the main valve body is illustrated at 206, and a top cap 208 is also shown which is secured to an end of the main body 206, such as again through each of a plurality of dowels, again representatively shown at 60.

The elbow sleeve is again illustrated with inlet 62 (along first centerline 64) and outlet (to cylinder) at 66, and along second perpendicular centerline 68. Likewise, the sleeve is again shown at 70 and which is biased in a normally open direction by a coil spring 72 seating against an interior configuration 74 associated with an end of the sleeve 70, and which biases against a seat/seal or other like cushioning support 74 in turn defining an inner end wall stop of an annulus 76, within which is seated the sleeve 70. The spring is further illustrated in a compressed condition, at 72', this corresponding to the sleeve 70 being displaced in a translating direction (not shown) corresponding to seating over and closing the elbow outlet 66 from its associated inlet 62 (see opposite end displaced locations 78).

The flow path previously referenced at 80 in FIG. 2 is substituted by a redesigned flow path in FIG. 9, shown at 210, and which communicates with the accumulator inlet 62. This again defines an upstream pressure source and which communicates with a first 212 of a pair of two-way valves (see also secondary two-way valve 214 which, as will be described, operates in tandem with two-way valve 212 in order to close to disable flow through the elbow valve).

The valve 214 operates to block the passageway 210 leading to a first interior region 216 and which affects an surface of the sleeve 70 in biasing contact with end wall stop 76 of the associated annulus (thus influencing the sleeve 70 in a spring opening and closing direction relative the flow path elbow). A further flow path 218 (contrast to flow path 84 in FIG. 2) is further located at a downstream location of the elbow (i.e. proximate to the outlet 66) and further communicates with a further interior region 220 (compared to at 86 in FIG. 2), via the second two-way valve 214. This is in turn accessible to an inner defined end surface 88 of the sleeve 70, and which correspondingly in turn influences, via modified and progressively narrow diameter orifices 222, 224 and 226 (see previously at 90, 92 and 94) communicating the second flow path 84 with the further interior region 220, thereby cushioning sleeve deceleration upon the sleeve being actuated to the closed position.

Additionally features of note include a sleeve position indicator 228, this typically being an electrically operated module and which senses and identifies the condition of the sleeve (i.e. between open 72 and closed 72' positions). An electrohydraulic valve 230 is also referenced and communicates, via passageways 232 (to assist in sleeve opening control), as well as at 234 in turn communicable with the annular back surface of the sleeve in sub-region 236 and to assist in sleeve closing control in order to further assist with sleeve position control.

Of note, the flow shut-off configuration illustrated in FIG. 2, constitutes a safety valve designed to rapidly close, in the event that flow from the accumulator (e.g. inlet 62) to the outlet 66 exceed exceeds a predetermined amount. In normal operation, the sleeve 70 is held open by the spring (at expanded position 72). Accordingly, and in the absence of flow, the pressure is the same everywhere within the valve.

The design of FIG. 9 otherwise operates similar to that previously described in reference to FIG. 2 and such that, during normal operation, flow from the accumulator 62 (via flow path 210) exists at a higher pressure than the outlet pressure (via flow path 218), this as a result of the pressure drop of flow (or head loss) as it travels around the elbow. As flow increases, the pressure drop likewise increases, until the point is reached in which the difference in the pressures in regions 82 and 220 is such that the pressure in region 82 is sufficiently great to act upon the sleeve 70 to overcome the spring force, thus causing the sleeve to translate to the closed position, thus creating an even greater pressure drop, in turn resulting in very rapid closure of the valve 56. It is further again noted that the cushioning orifices 222, 224 and 226 come into play at this point to provide a cushioning effect to the sleeve 70 as it deflects to an inner deflected end position (see further at 74') and corresponding to the spring being deflected to its fully closed position 72' and the annular extending end of the sleeve 70 abutting the inner sealing end stops 78.

As with the variant described in FIG. 2, and by virtue of the importance of the rapid response required of this type of valve application, the mass of the sleeve 70 is kept intentionally as small as possible and while again employing high strength materials. The flow passages (e.g. again at 210 and 218) are reciprocally again designed to be as large as practical, and so that restriction in these passages does not limit the responsiveness of the valve assembly 204.

Given again that the sleeve closes with sufficiently great speed, the hydraulic cushion is provided via the orifices 222 224, and 226, again and in order to provide the necessary cushioning effect. As illustrated, the desired cushioning effect is achieved by successively cutting off a series of flow passages in the region 220. Alternatively, the hydraulic cushion can again be relocated to the bottom end of the sleeve stroke (see approximate end stops 78).

Having described my invention, other and additional preferred embodiments will become apparent to those skilled in the art to which it pertains. In particular, the present inventions can be adapted for incorporation to air, hydraulic, or electrical control of the sliding sleeve position.

Control can be further established by a simple on/off function (e.g. through an externally applied signal), as well as proportionately controlled (e.g. as a variable of flow/pressure). Including the several valve examples previously described, additional commercial applications of valve assemblies incorporating the elbow-plug, external sleeve valve design with minimal flow pressure loss, are possible. These include, without limitation, such as two-way valves (both normally closed and open), relief valves (both direct and remote operated), flow shut-off valves, pressure reducing/pressure compensating flow control valves, isolation valves and anti-recoil valves for offshore tensioner and heave compensation systems, prefill valves for press and other operations, and in-piping mounted, right-angle, two way valve design.

I claim:

1. A valve, comprising:
 a plug positioned within a valve body, the plug forming a main flow path comprising:
 an inlet, an outlet, and a smooth, arcuate bend,
 wherein the main flow path extends through the plug,
 wherein the flow path through the plug has a constant cross section orthogonal to the flow, and
 wherein the main flow path is oriented for a fluid to flow in a first direction at the inlet and in a second direction at the outlet; and
 a valve gate switchable between an open position and a closed position, wherein the gate in the open position is located substantially out of the main flow path, and wherein the gate in the closed position blocks the main flow path,
 wherein the gate comprises a linearly-translatable sleeve,
 wherein the arcuate bend comprises an arc of a substantially constant radius,
 wherein the first direction is substantially perpendicular to the second direction,
 wherein the plug is an integrally-formed cast metal plug, and
 wherein the sleeve is hydraulically controlled as a function of a pressure differential in the fluid at two positions in the main flow path, such that the sleeve translates from the open position to the closed position when the pressure differential exceeds a predetermined threshold.

2. The valve of claim 1, wherein the radius is greater than the cross-sectional diameter of the flow path.

3. A valve, comprising:
 a plug positioned within a valve body, the plug forming a main flow path comprising:
 an inlet, an outlet, and a smooth, arcuate bend,
 wherein the main flow path extends through the plug,
 wherein the flow path through the plug has a constant cross section orthogonal to the flow, and wherein the main flow path is oriented for a fluid to flow in a first direction at the inlet and in a second direction at the outlet; and a valve gate switchable between an open position and a closed position, wherein the gate in the open position is located substantially out of the main flow path, and wherein the gate in the closed position blocks the main flow path, wherein the gate comprises a linearly-translatable sleeve, wherein the arcuate bend comprises an arc of a substantially constant radius, wherein the first direction is substantially perpendicular to the second direction, wherein the plug is an integrally-formed cast metal plug, wherein the sleeve is hydraulically controlled as a function of a pressure differential in the fluid at two positions in the main flow path, such that the sleeve translates from the open position to the closed position when the pressure differential exceeds a predetermined threshold, and wherein the valve gate closes with increasing speed as the valve gate moves toward the closed position.

4. A valve comprising:

a plug positioned within a valve body, the plug forming a main flow path comprising:
  an inlet, an outlet, and a smooth, arcuate bend,
  wherein the main flow path extends through the plug,
  wherein the flow path through the plug has a constant cross section orthogonal to the flow, and
  wherein the main flow path is oriented for a fluid to flow in a first direction at the inlet and in a second direction at the outlet; and a valve gate switchable between an open position and a closed position, wherein the gate in the open position is located substantially out of the main flow path, and wherein the gate in the closed position blocks the main flow path, wherein the gate comprises a linearly-translatable sleeve, wherein the arcuate bend comprises an arc of a substantially constant radius, wherein the first direction is substantially perpendicular to the second direction, wherein the plug is an integrally-formed cast metal plug, and wherein the sleeve is hydraulically controlled as a function of a pressure differential in the fluid at two positions in the main flow path, such that the sleeve translates from the open position to the closed position when the pressure differential exceeds a predetermined threshold, and a controller operating the valve gate as a function of a pressure differential in the fluid at positions on opposite ends of the bend in the flow path.

* * * * *